United States Patent
Chen et al.

(10) Patent No.: US 11,443,437 B2
(45) Date of Patent: Sep. 13, 2022

(54) VIBE-BASED THREE-DIMENSIONAL SONAR POINT CLOUD IMAGE SEGMENTATION METHOD

(71) Applicant: ZHEJIANG UNIVERSITY, Hangzhou (CN)

(72) Inventors: Yaowu Chen, Hangzhou (CN); Xiang Tian, Hangzhou (CN); Xuesong Liu, Hangzhou (CN); Rongxin Jiang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 178 days.

(21) Appl. No.: 16/980,390

(22) PCT Filed: Oct. 22, 2018

(86) PCT No.: PCT/CN2018/111148
§ 371 (c)(1),
(2) Date: Sep. 12, 2020

(87) PCT Pub. No.: WO2019/174236
PCT Pub. Date: Sep. 19, 2019

(65) Prior Publication Data
US 2021/0049769 A1     Feb. 18, 2021

(30) Foreign Application Priority Data

Mar. 14, 2018   (CN) .......................... 201810208737.0

(51) Int. Cl.
*G06T 7/20*     (2017.01)
*G06T 7/10*     (2017.01)
(Continued)

(52) U.S. Cl.
CPC ................ *G06T 7/194* (2017.01); *G06T 7/11* (2017.01); *G06T 7/136* (2017.01); *G06T 2207/10028* (2013.01)

(58) Field of Classification Search
None
See application file for complete search history.

(56) References Cited

U.S. PATENT DOCUMENTS

| 2008/0171932 | A1* | 7/2008 | Yan ........................ A61B 5/418 |
| | | | 600/410 |
| 2018/0232052 | A1* | 8/2018 | Chizeck .................... G06T 7/55 |
| 2018/0286117 | A1* | 10/2018 | Redden .................. G06T 17/05 |

FOREIGN PATENT DOCUMENTS

| CN | 106600622 | 4/2017 |
| CN | 107133966 | 9/2017 |
| WO | WO2014/172226 | 10/2014 |

* cited by examiner

*Primary Examiner* — Tapas Mazumder
(74) *Attorney, Agent, or Firm* — Jiwen Chen; Jacobson Holman PLLC

(57) ABSTRACT

The present invention discloses a ViBe-based three-dimensional sonar point cloud image segmentation method, characterized by including: (1) acquiring sonar data, and converting three-dimensional sonar depth image data corresponding to each frame of the sonar data to point cloud data under an orthogonal coordinate system; (2) sampling the point cloud data, and down-sampling the point cloud data to a plurality of adjacent voxels with side length being R by taking a variable resolution R as a function; (3) carrying out image segmentation on the down-sampled point cloud data by a ViBe algorithm; (4) carrying out accumulative scoring on each voxel according to an image segmentation result, and sorting foreground data and background data according to accumulative score; and (5) clustering the foreground data, and then carrying out expansion operation (Continued)

on the foreground data by taking an original point in the voxel as a center to obtain final foreground point cloud data.

9 Claims, 1 Drawing Sheet

(51) Int. Cl.
    *G06T 7/194*         (2017.01)
    *G06T 7/136*         (2017.01)
    *G06T 7/11*          (2017.01)

VIBE-BASED THREE-DIMENSIONAL SONAR POINT CLOUD IMAGE SEGMENTATION METHOD

This is a U.S. national stage application of PCT Application No. PCT/CN2018/111148 under 35 U.S.C. 371, filed Oct. 22, 2018 in Chinese, claiming priority of Chinese Application No. 201810208737.0, filed Mar. 14, 2018, all of which is hereby incorporated by reference.

TECHNICAL FIELD

The present invention belongs to the field of three-dimensional sonar point cloud image processing, and particularly relates to a Visual Background Subtraction (ViBe) based sonar point cloud image segmentation method.

BACKGROUND

The phased array three-dimensional sonar system is a new underwater three-dimensional acoustic imaging system and can be widely applied in aspects of real-time port monitoring, underwater operation of frogmen, etc.

However, during acquiring three-dimensional sonar point cloud data, some noise points will inevitably appear in the point cloud data due to the influence of changes in the surface properties of measured objects and data mosaicking and registration operation process as well as the influence of equipment accuracy, operator experience, underwater environmental factors, etc. In practice, in addition to those noise points generated by measurement random errors, there are often some discrete points, namely outliers, far away from the main point (the measured object point), in the point cloud data as a result of the influence of external interference such as obstacles. Point cloud noise structures vary from different acquisition devices. Filtering is the first step of pre-processing in the point cloud processing flow, which often causes a great impact on subsequent pipeline processing. Subsequent application processing of registration, feature extraction, surface reconstruction, visualization, etc. can be carried out very well as long as the noise points and the outliers are processed and customized in filtering pre-processing.

Visual Background Subtraction (ViBe) is a method applied to the field of video images and mainly used for removing backgrounds of the video images.

In view of the above problems, a reliable and high-efficiency three-dimensional sonar point cloud image segmentation method is urgently needed to be proposed. Such method will have very important engineering values.

SUMMARY OF THE INVENTION

The present invention aims to provide a ViBe-based three-dimensional sonar point cloud image segmentation method. The method is simple to operate, and is efficient and rapid, and foreground and background can be effectively segmented to achieve the purposes of reducing noise and enhancing the point cloud image.

To achieve the above purposes, the present invention provides the following technical solutions:

A ViBe-based three-dimensional sonar point cloud image segmentation method, comprising the following steps:

(1) acquiring sonar data, and converting acquired three-dimensional sonar depth image data corresponding to each frame of sonar data to point cloud data under an orthogonal coordinate system;

(2) sampling the point cloud data, and down-sampling the point cloud data to a plurality of adjacent voxels with side length being R by taking a variable resolution R as a function;

(3) carrying out image segmentation on the down-sampled point cloud data by a ViBe algorithm;

(4) carrying out accumulative scoring on each voxel according to an image segmentation result, and sorting foreground data and background data according to accumulative score; and (5) clustering the foreground data, and then carrying out expansion operation on the foreground data by taking an original point in the voxel as a center to obtain final foreground point cloud data.

Voxel is the abbreviation of a volume element. The voxel is the minimum unit of digital data segmented in a three-dimensional space and is used in the fields of three-dimensional imaging, etc. A plurality of point data are included in one voxel.

Preferably, the total point cloud data are directly down-sampled to obtain a plurality of adjacent voxels with side length being R.

Preferably, a part of point cloud data are sequentially and segmentally down-sampled to obtain a plurality of adjacent voxels with side length being R.

Preferably, the step (3) comprises the following steps:

(3-1) for each voxel, randomly selecting n points as a sample space of the voxel in N-neighborhood of the voxel;

(3-2) during segmenting the point cloud image of a certain frame, carrying out similarity counting on each voxel of the frame and a sample space of the same coordinate corresponding to the point cloud image of the frame, adding 1 to a fitting counter $C_1$ when the intensity difference between the voxel and a point in the sample space is smaller than a threshold $T_1$, considering the voxel as the background data if the whole sample space is compared and the $C_1$ is larger than or equal to the threshold $T_2$, otherwise considering the voxel as pre-foreground data;

(3-3) during segmenting each frame of point cloud image, changing the voxel to the background data if one foreground point is judged as the pre-foreground data at times exceeding a threshold $T_3$; and (3-4) updating one point of the sample space of the corresponding coordinate if one voxel is the background data and occurs with a probability of 1/Alpha (1/α), and updating one point of the sample space of one own neighborhood if the probability of 1/Alpha exits.

In the present invention, the step (4) needs to be proceeded no matter whether the background data is acquired through the step (3-2) or the step (3-3).

In the above, a value of the threshold $T_1$ is 0.01-10,000.00, a value of the threshold $T_2$ is from 1 to point numbers of the sample space, and a value of the threshold $T_3$ is 10-100. It has been verified by a lot of experiments that more accurate segmentation of the voxels can be achieved by setting such group of thresholds, i.e., the voxels can be more accurately segmented to the foreground data or the background data.

Preferably, in the step (4), if one voxel, in the calculating process, is judged as the pre-foreground data at times not less than $S_1$ times when the step (3) is ended, the voxel is judged as the foreground data, otherwise the voxel is judged as the background data, and a value of the $S_1$ is 50.

Preferably, in the step (5), the nearest neighbor-clustering method is adopted to cluster the foreground data to obtain one or more voxel sets, and a distance threshold $T_4$ of clustering is 1.0-20.0.

Preferably, in the step (5), an expansion operation with expansion kernels being $E_1$, $E_2$, and $E_3$ is carried out on the foreground data after clustered results are reflected onto the original point in the voxel, values of $E_1$, $E_2$, and $E_3$ are all odd numbers from 1 to 21, furthermore, the values of $E_1$, $E_2$, and $E_3$ are 5.

Compared with the prior art, the present invention has the following technical benefits:

(1) Before processing a large amount of point cloud data which is acquired, a large part of outliers can be selectively removed by the method, the influence of equipment and environmental noise is reduced, meanwhile, the subsequent processing workload is reduced, the data validity is improved, post image reconstruction is facilitated, and the purpose of image enhancement is achieved.

(2) The outliers can be removed to different extents by artificially setting a parameter value according to different equipment and environments, without changing a program of the system again, such that the present invention is convenient and rapid, and has high practicability and flexibility.

(3) The segmentation method is high in efficiency, three-dimensional sonar point cloud image enhancement is completed by a special algorithm, the program running time is short, the data processing speed is rapid, and the real-time requirement is met.

DETAILED DESCRIPTION

Figure 1:
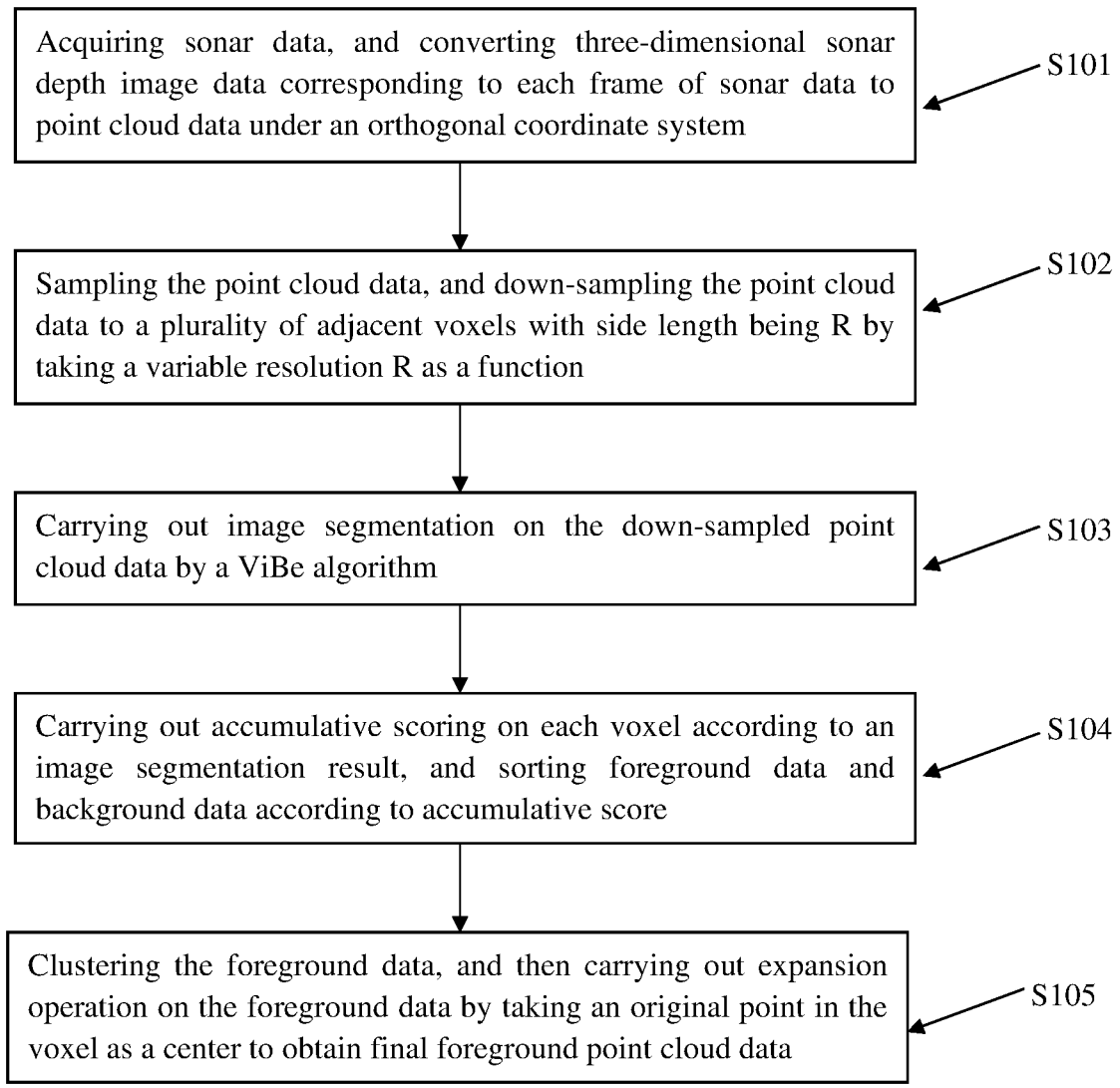
FIG. 1 is a flow chart of a ViBe-based three-dimensional sonar point cloud image segmentation method provided by an embodiment of the present invention.

For more clarity of the objects, technical solutions, and advantages in the present invention, the present disclosure is described in details below with reference to the accompanying drawings and embodiments. It should be understood that the embodiments described herein are only for explaining the present invention, but not for limiting the present invention.

FIG. 1 is a flow chart of a ViBe-based three-dimensional sonar point cloud image segmentation method provided by an embodiment of the present invention. As shown in FIG. 1, the three-dimensional sonar point cloud image segmentation method provided by the embodiment of the present invention, comprising the following steps:

In S101, sonar data is acquired, and three-dimensional sonar depth image data corresponding to each frame of sonar data is converted to point cloud data under an orthogonal coordinate system.

In the embodiment, the three-dimensional sonar depth image data is converted from spherical product coordinates to rectangular coordinates to obtain the point cloud data under the orthogonal coordinate system.

In S102, the total point cloud data is directly sampled, and the point cloud data is down-sampled to a plurality of adjacent voxels with side length being R by taking a variable resolution R as a function.

In the embodiment, R has six segmented values respectively being 16×16×16, 64×64×64, 84×84×64, 112×112×64, 140×140×64, and 176×176×64.

In S103, image segmentation is carried out on the down-sampled point cloud data by a ViBe algorithm, including:

(a) For each voxel, randomly selecting n points as a sample space of the voxel in N-neighborhood of the voxel;

(b) During segmenting the point cloud image of a certain frame, carrying out similarity counting on each voxel of the frame and a sample space of the same coordinate corresponding to a point cloud image of the frame, adding 1 to a fitting counter $C_1$ when the intensity difference between the voxel and a point in the sample space is smaller than a threshold $T_1$, considering the voxel as the background data if the whole sample space is compared and the $C_1$ is larger than or equal to the threshold $T_2$, otherwise considering as pre-foreground data;

(c) During segmenting each frame of point cloud image, changing the voxel to the background data if one foreground point is judged as the pre-foreground data at times exceeding a threshold $T_3$; and (d) Updating one point of the sample space of the corresponding coordinate if one voxel is the background data and occurs with probability of 1/Alpha, and updating one point of the sample space of one own neighborhood if the probability of 1/Alpha exits.

A value of Alpha is generally 2-50. In the embodiments, the value of Alpha is 16, a value of the $T_1$ is 1, a value of the $T_2$ is 2, a value of the $T_3$ is 50, and a value of the $T_4$ is 2.

In S104, accumulative scoring is carried out on each voxel according to an image segmentation result, and the foreground data and the background data are sorted according to accumulative score.

Specially, if one voxel, in the calculating process, is judged as the pre-foreground data at times not less than S times when the step (3) is ended, the voxel is judged as the foreground data, otherwise the voxel is judged as the background data. In the embodiment, a value of the S is 50.

In S105, the foreground data is clustered, and then expansion operation is carried out on the foreground data by taking an original point in the voxel as a center to obtain final foreground point cloud data.

For isolated points outside the voxels, these points may be the foreground data but not in the voxels. To obtain a more accurate segmentation result, an expansion operation can be adopted to solve the problem. Specially, the nearest neighbor-clustering method is adopted to cluster the foreground data to obtain one or more voxel sets, wherein a distance threshold $T_4$ of clustering is 2; and then expansion operation with expansion kernels being $E_1$, $E_2$, and $E_3$ is carried out on the foreground data after clustered results are reflected onto the original point in the voxel, wherein the value of $E_1$ is 5, the value of $E_2$ is 5, and the value of $E_3$ is 5.

By the segmentation method according to the embodiment of the present invention, three-dimensional sonar point cloud image enhancement can be completed, the program running time is short, the data processing speed is rapid, and the real-time requirement is met.

The technical solutions and the beneficial effects of the present invention are described in details in the embodiments. It should be understood that the above descriptions are merely the most preferred embodiments of the present invention and are not intended to limit the present invention. Within the principles of the present invention, any modifications, supplements, equivalent replacements, etc. are within the protection scope of the present invention.

The invention claimed is:

1. A Visual Background Subtraction (ViBe) based three-dimensional sonar point cloud image segmentation method, characterized by comprising the following steps of:

(1) acquiring sonar data, and converting three-dimensional sonar depth image data corresponding to each frame of the sonar data to point cloud data under an orthogonal coordinate system;

(2) sampling the point cloud data, and down-sampling the point cloud data to a plurality of adjacent voxels with side length being R by taking a variable resolution R as a function;

(3) carrying out image segmentation on the down-sampled point cloud data by a ViBe algorithm;

(4) carrying out accumulative scoring on each voxel according to an image segmentation result; sorting foreground data and background data according to accumulative score; and (5) clustering the foreground data, and then carrying out expansion operation on the foreground data by taking an original point in the voxel as a center to obtain final foreground point cloud data.

2. The ViBe-based three-dimensional sonar point cloud image segmentation method according to claim 1, wherein total point cloud data is directly down-sampled to obtain a plurality of adjacent voxels with side length being R.

3. The ViBe-based three-dimensional sonar point cloud image segmentation method according to claim 1, wherein a part of point cloud data is sequentially and segmentally down-sampled to obtain a plurality of adjacent voxels with side length being R.

4. The ViBe-based three-dimensional sonar point cloud image segmentation method according to claim 1, wherein the step (3) comprises the following steps of:

(3-1) for each voxel, randomly selecting n points as a sample space of the voxel in N-neighborhood of the voxel;

(3-2) during segmenting the point cloud image of a certain frame, carrying out similarity counting on each voxel of the frame and a sample space of the same coordinate corresponding to a point cloud image of the frame, adding 1 to a fitting counter $C_1$ when the intensity difference between the voxel and a point in the sample space is smaller than a threshold $T_1$, considering the voxel as the background data if the whole sample space is compared and the $C_1$ is larger than or equal to the threshold $T_2$, otherwise considering the background data as pre-foreground data;

(3-3) during segmenting each frame of point cloud image, changing the voxel to the background data if one foreground point is judged as the pre-foreground data at times exceeding a threshold $T_3$; and (3-4) updating one point of the sample space of the corresponding coordinate if one voxel is the background data and occurs with probability of 1/Alpha, and updating one point of the sample space of one own neighborhood if the probability of 1/Alpha exits.

5. The ViBe-based three-dimensional sonar point cloud image segmentation method according to claim 1, wherein in the step (4), if one voxel, in the calculating process, is judged as the pre-foreground data at times not less than $S_1$ times when the step (3) is ended, the voxel is judged as the foreground data, otherwise the voxel is judged as the background data.

6. The ViBe-based three-dimensional sonar point cloud image segmentation method according to claim 4, wherein a value of threshold $T_1$ is 0.01-10,000.00, a value of the threshold $T_2$ is from 1 to point numbers of the sample space, and a value of the threshold $T_3$ is 10-100.

7. The ViBe-based three-dimensional sonar point cloud image segmentation method according to claim 1, wherein in the step (5), the nearest neighbor-clustering method is adopted to cluster the foreground data to obtain one or more voxel sets, and a distance threshold $T_4$ of clustering is 1.0-20.0.

8. The ViBe-based three-dimensional sonar point cloud image segmentation method according to claim 7, wherein in the step (5), an expansion operation with expansion kernels being E1, E2, and E3 is carried out on the foreground data after clustered results are reflected onto the original point in the voxel, and values of E1, E2, and E3 are all odd numbers from 1 to 21.

9. The ViBe-based three-dimensional sonar point cloud image segmentation method according to claim 1, wherein in the step (5), an expansion operation with expansion kernels being $E_1$, $E_2$, and $E_3$ is carried out on the foreground data after clustered results are reflected onto the original point in the voxel, and values of $E_1$, $E_2$, and $E_3$ are all odd numbers from 1 to 21.

* * * * *